United States Patent
Zhang et al.

(10) Patent No.: US 10,853,695 B2
(45) Date of Patent: Dec. 1, 2020

(54) METHOD AND SYSTEM FOR CELL ANNOTATION WITH ADAPTIVE INCREMENTAL LEARNING

(71) Applicant: Konica Minolta Laboratory U.S.A., Inc., San Mateo, CA (US)

(72) Inventors: Yongmian Zhang, San Mateo, CA (US); Jingwen Zhu, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 98 days.

(21) Appl. No.: 16/306,490

(22) PCT Filed: Jun. 27, 2017

(86) PCT No.: PCT/US2017/039378
§ 371 (c)(1),
(2) Date: Nov. 30, 2018

(87) PCT Pub. No.: WO2018/005413
PCT Pub. Date: Jan. 4, 2018

(65) Prior Publication Data
US 2019/0180147 A1    Jun. 13, 2019

Related U.S. Application Data

(60) Provisional application No. 62/356,916, filed on Jun. 30, 2016, provisional application No. 62/356,883, filed on Jun. 30, 2016.

(51) Int. Cl.
*G06K 9/62* (2006.01)
*G06N 20/00* (2019.01)
*G06K 9/00* (2006.01)

(52) U.S. Cl.
CPC ......... *G06K 9/6262* (2013.01); *G06K 9/0014* (2013.01); *G06K 9/00147* (2013.01);
(Continued)

(58) Field of Classification Search
CPC .. G06N 20/00; G06K 9/0014; G06K 9/00147; G06K 9/6215; G06K 9/6262;
(Continued)

(56) References Cited

U.S. PATENT DOCUMENTS 5,287,272 A      2/1994   Rutenberg et al.
6,163,622 A *   12/2000   Abdel-Mottaleb ........................ G06K 9/6212
                                                                      382/170
(Continued)

FOREIGN PATENT DOCUMENTS

CN     104102837 A    10/2014
WO     2010/139697 A1 12/2010
WO     2015177268 A1  11/2015

OTHER PUBLICATIONS

Impoco et al. "Incremental learning to segment micrographs." Computer Vision and Image Understanding 140 (Mar. 2015): 144-152. (Year: 2015).*

(Continued)

*Primary Examiner* — Katrina R Fujita
(74) *Attorney, Agent, or Firm* — Buchanan Ingersoll & Rooney PC

(57) ABSTRACT

A method, a computer readable medium, and a system for cell annotation are disclosed. The method includes receiving at least one new cell image for cell detection; extracting cell features from the at least one new cell image; comparing the extracted cell features to a matrix of cell features of each class to predict a closest class, wherein the matrix of cell features has been generated from at least initial training data (Continued)

comprising at least one cell image; detecting cell pixels from the extracted cell features of the at least one new cell image using the predicted closest class to generate a likelihood map; extracting individual cells from the at least one cell image by segmenting the individual cells from the likelihood map; and performing a machine annotation on the extracted individual cells from the at least one new cell image to identify cells, non-cell pixels, and/or cell boundaries.

17 Claims, 7 Drawing Sheets

(52) U.S. Cl.
CPC ........... *G06K 9/627* (2013.01); *G06K 9/6215* (2013.01); *G06K 9/6277* (2013.01); *G06N 20/00* (2019.01); *G06T 2207/30024* (2013.01)

(58) Field of Classification Search
CPC .................. G06K 9/627; G06K 9/6277; G06T 2207/30024
See application file for complete search history.

(56) References Cited

U.S. PATENT DOCUMENTS

| | | | |
|---|---|---|---|
| 7,844,558 B2 | 11/2010 | Yuan et al. | |
| 8,165,407 B1 * | 4/2012 | Khosla | G06K 9/4623 382/164 |
| 8,676,826 B2 | 3/2014 | Dhoolia et al. | |
| 9,025,811 B1 * | 5/2015 | Ioffe | G06F 16/5838 382/100 |
| 9,064,149 B1 * | 6/2015 | Dhua | G06K 9/4652 |
| 2003/0050719 A1 | 3/2003 | Bao-liang et al. | |
| 2004/0199482 A1 | 10/2004 | Wilson | |
| 2005/0027664 A1 | 2/2005 | Johnson et al. | |
| 2008/0166035 A1 | 7/2008 | Qian et al. | |
| 2011/0069905 A1 | 3/2011 | Adiga et al. | |
| 2012/0322145 A1 | 12/2012 | Onofiok et al. | |
| 2015/0004630 A1 | 1/2015 | Lange et al. | |
| 2015/0213325 A1 | 7/2015 | Krishnamoorthi et al. | |
| 2016/0042511 A1 | 2/2016 | Chukka et al. | |

OTHER PUBLICATIONS

Office Action (Communication) dated Mar. 25, 2020, by the European Patent Office in corresponding European Patent Application No. 17821044.9. (4 pages).

H. He et al., "Incremental Learning from Stream Data", IEEE Transactions on Neural Networks, vol. 22, No. 12, Dec. 2011, pp. 1901-1914.

Supplementary European Search Report dated Jun. 14, 2019 in European Application No. 17821044.9.

Yin Zhou et al., Nuclei Segmentation via Sparsity Constrained Convolutional Regression, IEEE 12th International Symposium on Biomedical Imaging (ISBI), IEEE, pp. 1284-1287, Apr. 16, 2015, XP033179689.

International Search Report (PCT/ISA/210) dated Oct. 20, 2017, by the United States Patent Office as the International Searching Authority for International Application No. PCT/US2017/039378.

Written Opinion (PCT/ISA/237) dated Oct. 20, 2017, by the United States Patent Office as the International Searching Authority for International Application No. PCT/US2017/039378.

* cited by examiner

METHOD AND SYSTEM FOR CELL ANNOTATION WITH ADAPTIVE INCREMENTAL LEARNING

CROSS-REFERENCES TO RELATED APPLICATIONS

This application claims priority to U.S. Provisional Application No. 62/356,883 filed on Jun. 30, 2016, and U.S. Provisional Application No. 62/356,916 filed on Jun. 30, 2016, the entire contents of which are incorporated herein by reference.

FIELD OF THE INVENTION

This disclosure relates to method and system that can perform a continuous learning process as new classes of cell images are received, and then gradually expands its capacity to predict increasing number of new classes of cell images over time, and can, for example, be applied for automatic cell image annotation in pathological analysis.

BACKGROUND OF THE INVENTION

Accurate cell body extraction greatly helps to quantify cell features for further pathological analysis of cancer cells. In a practical scenario, cell image data often has the following issues: wide variety of appearances resulting from different tissue types, block cuttings, staining process, equipment and hospitals; cell image data is gradually collected over time, and collected data is usually unbalanced, for example, some types of cell images are greater than other types of cell images.

Supervised machine-learning algorithms are often used for tackling image classification tasks. However, one unresolved issue with machine learning algorithms is that such a fixed model is trained with a static snapshot of data and it cannot suit the aforementioned scenarios when new classes and data in a class become available.

SUMMARY OF THE INVENTION

Accordingly, it would be desirable to have a cell detection system that performs a continuous learning process as a new class of cell images arrive and/or are received, and incrementally expands its prediction capacity of new classes of cell images.

A method is disclosed for cell annotation, the method comprising: receiving at least one new cell image for cell detection; extracting cell features from the at least one new cell image; comparing the extracted cell features to a matrix of cell features of each class to predict a closest class, wherein the matrix of cell features has been generated from at least initial training data comprising at least one cell image; detecting cell pixels from the extracted cell features of the at least one new cell image using the predicted closest class to generate a likelihood map; extracting individual cells from the at least one cell image by segmenting the individual cells from the likelihood map; performing a machine annotation on the extracted individual cells from the at least one new cell image to identify cells, non-cell pixels, and/or cell boundaries; calculating a confidence level for the machine annotation on the extracted individual cells from the at least one new cell image; and modifying the machine annotation if the confidence level is below a predetermined threshold.

A non-transitory computer readable medium containing a computer program storing computer readable code for cell annotation is disclosed, the program being executable by a computer to cause the computer to perform a process comprising: receiving at least one new cell image for cell detection; extracting cell features from the at least one new cell image; comparing the extracted cell features to a matrix of cell features of each class to predict a closest class, wherein the matrix of cell features has been generated from at least initial training data comprising at least one cell image; detecting cell pixels from the extracted cell features of the at least one new cell image using the predicted closest class to generate a likelihood map; extracting individual cells from the at least one cell image by segmenting the individual cells from the likelihood map; performing a machine annotation on the extracted individual cells from the at least one new cell image to identify cells, non-cell pixels, and/or cell boundaries; calculating a confidence level for the machine annotation on the extracted individual cells from the at least one new cell image; and modifying the machine annotation if the confidence level is below a predetermined threshold.

A system is disclosed for cell annotation, the system comprising: at least one processor configured to: receive at least one new cell image for cell detection; extract cell features from the at least one new cell image; compare the extracted cell features to a matrix of cell features of each class to predict a closest class, wherein the matrix of cell features has been generated from at least initial training data comprising at least one cell image; detect cell pixels from the extracted cell features of the at least one new cell image using the predicted closest class to generate a likelihood map; extract individual cells from the at least one cell image by segmenting the individual cells from the likelihood map; perform a machine annotation on the extracted individual cells from the at least one new cell image to identify cells, non-cell pixels, and/or cell boundaries; calculate a confidence level for the machine annotation on the extracted individual cells from the at least one new cell image; and modify the machine annotation if the confidence level is below a predetermined threshold.

A method is disclosed of adaptive incremental learning for cell annotation, the method comprising: generating a matrix of cell features for each of a plurality of classes of cell images; identifying one or more cell features of each of the plurality of classes of cell images; updating the one or more cell features for each of the plurality of classes of cell images upon receipt of additional cell images; constructing a plurality of classifiers for each of the plurality of classes of cell images, each of the plurality of classifiers corresponding to one or more cell features; weighting each of the plurality of classifiers for each of the plurality of classes of cell images; obtaining a new cell image; identifying a class from the plurality of classes in which the cell image belongs, and if no class is identified, creating a new class; if the cell image belongs to the class from the plurality of classes, extracting features from cell image and using the extracted features to generate a new classifier for the class from the plurality of classes if a classification error rate is less than a predetermined threshold, and if the classification error rate is greater than the threshold, classifying the extracted features as the new class; and if the new classifier is generated, appending the new classifier to the plurality of classifiers for the class from the plurality of classes.

A non-transitory computer readable medium containing a computer program storing computer readable code for adaptive incremental learning for cell annotation is disclosed, the program being executable by a computer to cause the computer to perform a process comprising: generating a matrix of cell features for each of a plurality of classes of cell images; identifying one or more cell features of each of the plurality of classes of cell images; updating the one or more cell features for each of the plurality of classes of cell images upon receipt of additional cell images; constructing a plurality of classifiers for each of the plurality of classes of cell images, each of the plurality of classifiers corresponding to one or more cell features; weighting each of the plurality of classifiers for each of the plurality of classes of cell images; obtaining a new cell image; identifying a class from the plurality of classes in which the cell image belongs, and if no class is identified, creating a new class; if the cell image belongs to the class from the plurality of classes, extracting features from cell image and using the extracted features to generate a new classifier for the class from the plurality of classes if a classification error rate is less than a predetermined threshold, and if the classification error rate is greater than the threshold, classifying the extracted features as the new class; and if the new classifier is generated, appending the new classifier to the plurality of classifiers for the class from the plurality of classes.

A system is disclosed for adaptive incremental learning for cell annotation, the system comprising: at least one processor configured to: generate a matrix of cell features for each of a plurality of classes of cell images; identify one or more cell features of each of the plurality of classes of cell images; update the one or more cell features for each of the plurality of classes of cell images upon receipt of additional cell images; construct a plurality of classifiers for each of the plurality of classes of cell images, each of the plurality of classifiers corresponding to one or more cell features; weight each of the plurality of classifiers for each of the plurality of classes of cell images; obtain a new cell image; identify a class from the plurality of classes in which the cell image belongs, and if no class is identified, creating a new class; if the cell image belongs to the class from the plurality of classes, extract features from cell image and using the extracted features to generate a new classifier for the class from the plurality of classes if a classification error rate is less than a predetermined threshold, and if the classification error rate is greater than the threshold, classify the extracted features as the new class; and if the new classifier is generated, append the new classifier to the plurality of classifiers for the class from the plurality of classes.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
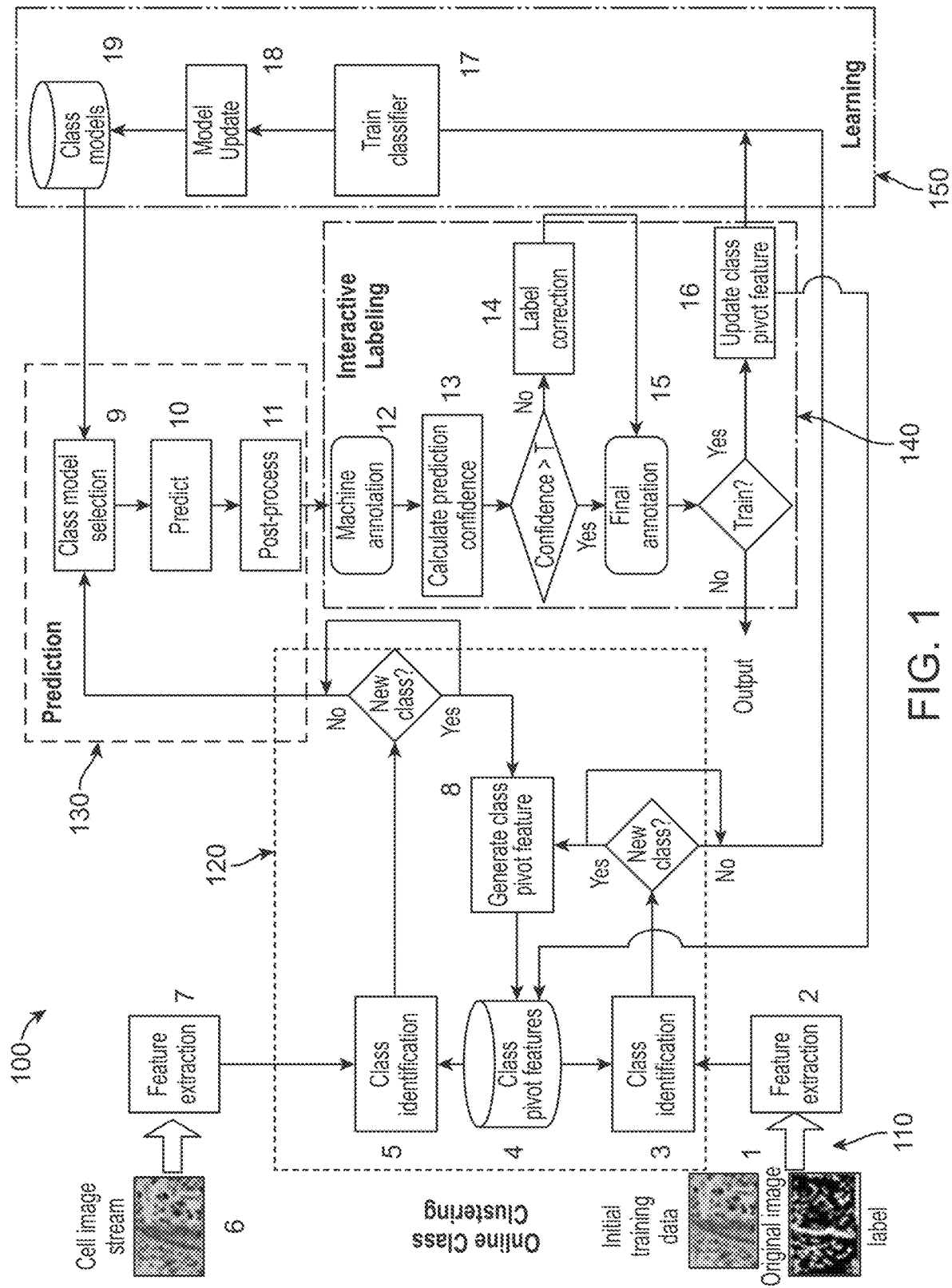
FIG. 1 is a flow chart illustrating a system for cell annotation with adaptive incremental learning in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method are disclosed, which can use unsupervised learning to learn the class of cell images according to similarity of image feature and the arrival or receipt of new cell images are self-organized into different class models.

In accordance with an exemplary embodiment, a data mapping function is disclosed, which is significantly different from other known systems. For example, in accordance with an embodiment, the system can use a data divergence measure, which can greatly boost the cell detection performance, while other known systems use a non-linear mapping with neural network.

In accordance with an exemplary embodiment, cell image data can be gradually collected from different modalities and different anatomy parts with large variation in image stains, background noises, cell sizes and shapes. In addition, the classes of data are often unbalanced. Many known machine-learning algorithms, for example, assume the training data is available at one time, which is not suitable for the above scenarios.

In accordance with an exemplary embodiment, the present disclosure provides an intelligent system to accommodate for the practical scenario of cell annotation by learning from the arrival of data incrementally, and can bring about several benefits in cell image annotation including: (1) a confidence measure of machine labeled results assists the end user to make decision whether the manual correction is needed or not; (2) data divergence distribution measures the likelihood of unseen features from previous time and it effectively encourages learning process to gradually shift more attention on the unseen features; (3) the likelihood measure of the prediction response effectively helps for the segmentation of overlapped cells; (4) automatically prune a weaker classifier when the number of classifiers reaches a predetermined threshold; (5) the way of similarity measure between two image in cell image clustering offsets the effect of image noise and any abnormality in value; (6) automatically group cell images into different cell classes so that the end users do not need to know about cell types and modalities that cell images belong to; (7) the system only needs one labeled image for initial learning and the performance gradually improves during continuous learning process; and (8) if the arrival image belongs to an unknown class, the system can still predict cell labels with improved accuracy, for example, as shown herein, statistically over 85% accuracy, which greatly reduces human labeling work.

Online Class Clustering

FIG. 1 is a flow chart illustrating a system 100 for cell annotation with adaptive incremental learning in accordance with an exemplary embodiment. In accordance with an exemplary embodiment, for example, the system 100 can be configured into different block or modules. For example, the system 100 can include a feature extraction module 110, a class identification module 120, a learning prediction module 130, a prediction module 140, and a learning module 150. The system and/or modules 100, 110, 120, 130, 140, and 150 can include one or more computer or processing devices having a memory, a processor, an operating system and/or software and/or an optional graphical user interface (GUI) and/or display. In accordance with an exemplary embodiment, for example, each of the modules 110, 120, 130, 140, 150 can be combined in one computer device, for example, a standalone computer, or can be contained within one or more computer devices, wherein each of the one or more computer devices has a memory, a processor, an operating system and/or software, and a graphical user interface (GUI) or display.

In accordance with an exemplary embodiment, the system 100 is configured such that step 1, initial training data is received in the extraction module 110. For example, in accordance with an exemplary embodiment, initially, the system 100 learns a prior model using a few labeled samples, which is the starting point for the incremental learning and the model will be updated during each run of a training process. In step 2, a feature extraction is performed on the initial training data (original cell images). In step 2, the features of cell images are extracted through this function and the features can be used for both the prediction module 130 and/or the learning module 150.

In accordance with an exemplary embodiment, the online clustering module 120 in step 3 performs a class identification, which can include determining whether the arrival of a cell image belongs to an unknown class or an existing (or known) class. In step 4, a class pivot feature module or database is provided, which can be a matrix for holding the central features for each class of cell images and used for identifying the class of the input image. In step 5, class identification is performed, which can include determining whether the arrival of a cell image belongs to an unknown class or an existing (or known) class.

In accordance with an exemplary embodiment, in step 6, the system 100 receives a cell image stream for detection. In step 7, feature extraction is performed, wherein the features of cell image are extracted and the extracted features can be used in both the learning module 150 and the prediction module 130.

In step 8, a class pivot feature is generated, which extract features for each class of cell images and stores the feature vector in the class pivot feature module or date base (step 4), "Class Pivot Feature". In step 9, a class model selection is performed, which can include finding a closest class that a given cell image belongs to through feature similarity matching. In step 10, a prediction is performed for detected cell pixels from a given cell image by using trained classifiers, and the output can be, for example, provided in a likelihood map. In step 11, a post process extraction is performed in which individual cells are extracted from a given cell image by segmenting them from the likelihood map outputted from the prediction step.

In accordance with an exemplary embodiment, in step 12, a machine annotation (or post processing) can be performed using the output from step 11, wherein cell and non-cell pixels and cell boundaries can be marked. In step 13, a prediction confidence can be calculated, which gives a confidence level (percentage) of the machine detection result. In step 14, correction labeling can be performed, which can include modifying the machine labeled results, for example, by manual intervention, in the case that the confidence level is lower than the certain threshold or level and wherein the image belongs to a unknown class. In step 15, a final annotation is performed, which can include annotation results that can be used for pathology analysis or for feedback for further learning. In step 16, the class pivot feature is updated, which can include updating the pivot feature of a class when additional images belonging to the class involve training.

In accordance with an exemplary embodiment, in step 17, a class is identified and then a weak classifier for that class can be trained. With the continuous arrival data for this class, a series of weight distribution functions can be developed to represent the learning capability of data in each class. In step 18, to avoid being over obsessive and to gradually adapt the newly arrival of images, the obsolete classifiers are removed when a new model is learned and the number of classifiers is over a threshold during learning process. In step 19, a class model is performed, in which data structures containing all weak classifiers are indexed according to their class.

In accordance with an exemplary embodiment, the system 100 has the following features that differ from the known system with incremental learning mechanism:

(1) a confidence measure of machine labeled results;
(2) data divergence distribution measures the likelihood of unseen features;
(3) the similarity measure between two images in cell image clustering;
(4) the likelihood measure of the prediction response; and
(5) automatically group cell images into different cell classes.

In accordance with an exemplary embodiment, for example, the method and system as disclosed can bring about several benefits in cell image annotation, which can include:

(1) automatically group cell images into different cell classes so that the end users do not need to know about cell types and modalities that cell images belong to;
(2) the system only needs one labeled image for initial learning and the performance gradually improves during a continuous learning process;
(3) if the arrival image belongs to an unknown class, the system can still predict cell labels with improved accuracy, which greatly reduces human labeling work;

(4) a confidence measure of machine labeled results assists the end user to make decision whether the manual correction is needed or not;

(5) data divergence distribution measures the likelihood of unseen features from previous time and it effectively encourages learning process to gradually shift more attention on the unseen features;

(6) the likelihood measure of the prediction response effectively helps for the segmentation of overlapped cells;

(7) automatically prune a weaker classifier when the number of classifiers reaches a predetermined threshold; and (8) the measure of similarity between two images in cell image clustering offsets the effect of image noise and any abnormality in value.

Figure 2:
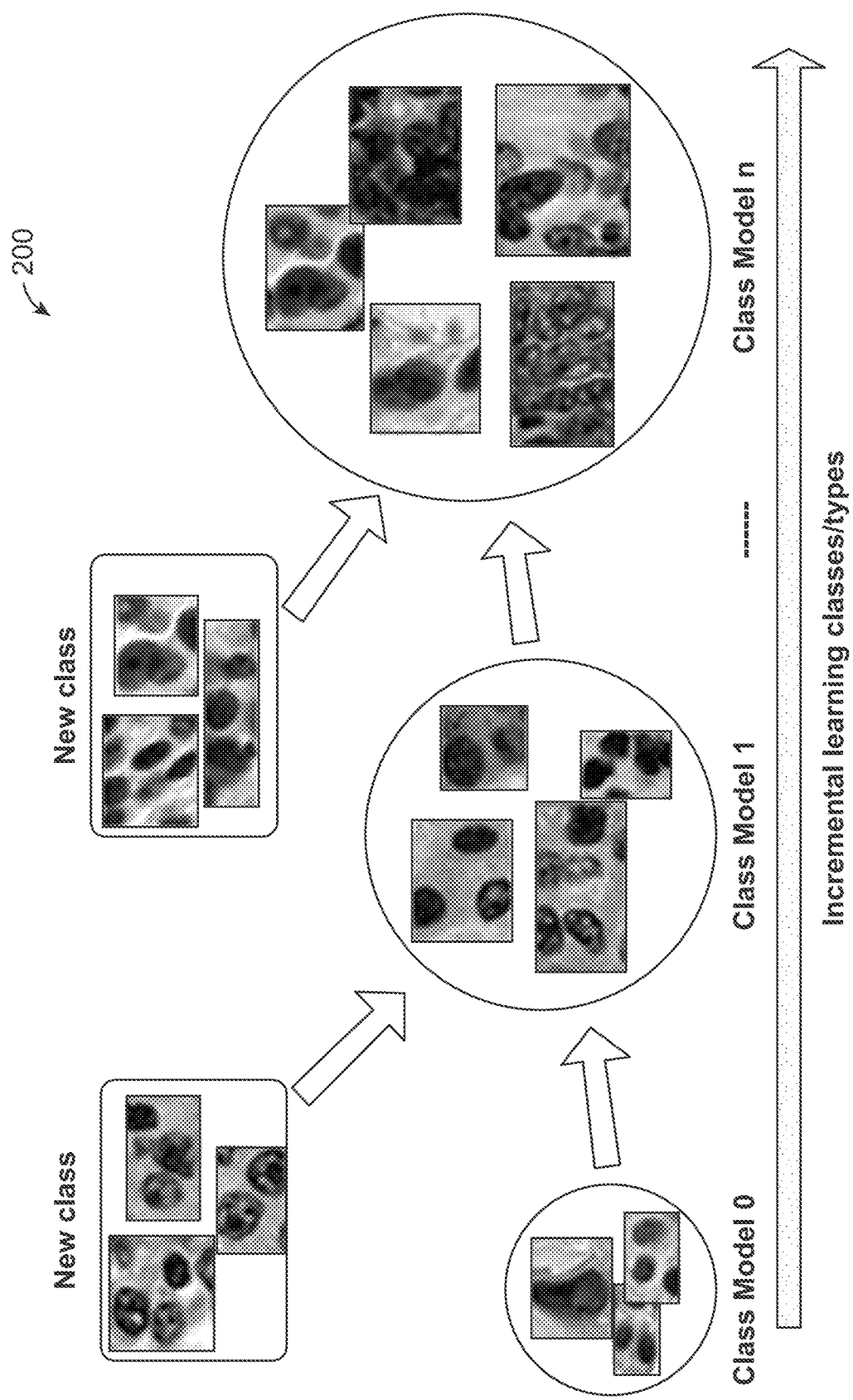
FIG. 2 is an illustration of cell images, which are grouped online into different classes during continuous learning in accordance with an exemplary embodiment.

In accordance with an exemplary embodiment, as illustrated in FIG. 2, the online class clustering groups the input cell images into different classes 200 according to image similarities during a continuous learning process. The purpose is to address the wide variety of appearances of the cell images. In accordance with an exemplary embodiment, each class is associated with a classifier, which can be incrementally built and gradually updated by the arrival of new cell images.

In accordance with an exemplary embodiment, the system and method as disclosed herein can use the following color distribution-based approach for image grouping. For example, let H(a) its histogram for image a and H(b) for image b with k histogram bins, the colors in the image can be mapped into a discrete color space containing k colors, then the color histogram H(a) is a vector $[h_1(a), \ldots, h_k(a)]$, and H(b) is a vector $[h_1(b), \ldots, h_k(b)]$.

In accordance with an exemplary embodiment, the similarity of two images can be measured (or calculated) by a Euclidean distance between two histograms. It should be noted, that Euclidean distance can suffer from sensitivity even to a small deformation. For example, if there is abnormality in one value in one of vectors, this can be reflected in the result of the distance. Thus, the following measurement can be used to measure the similarity between two images through their histograms.

$$D(H(a), H(b)) = \sum_{1}^{k} \left(1 - \frac{1 + |\min(h_i(a), h_i(b))|}{1 + |\max(h_i(a), h_i(b))| + |\min(h_i(a), h_i(b))|}\right) \quad (1)$$

In accordance with an exemplary embodiment, the online class clustering can consist of two modules: class identification and generating a new class. When a new data arrives, the class identification module (step 5) verifies whether the new arrival of data belongs to an existing class or not by using Equation (1). If D(H(a), H(b)) is greater than a predefined threshold, the arrival of data belongs to an unknown class, and thus, a new class is built with class pivot features extracted in step 8.

Incremental Learning of Cell Images

Figure 3:
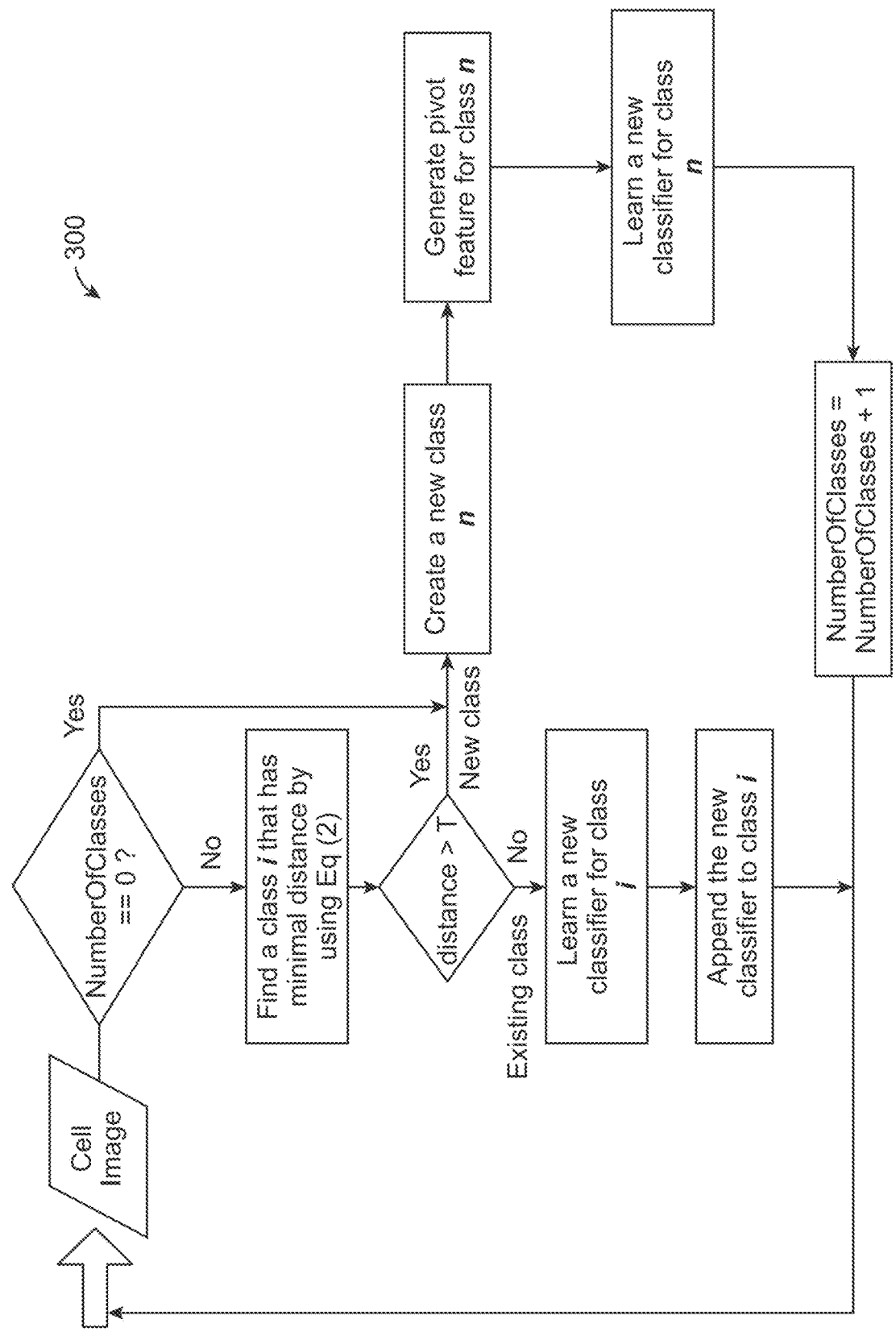
FIG. 3 is a diagram illustrating how cell images are grouped into different classes during the continuous learning process in accordance with an exemplary embodiment.

In accordance with an exemplary embodiment, although cell images are grouped into different classes, there is still in-class image variation over time as the data are gradually collected in a continuous learning process. In accordance with an exemplary embodiment, as shown in FIG. 3, adaptive incremental learning 300 can be used to solve such a dynamic problem. The adaptive incremental learning 300 can use an ensemble method by constructing a set of classifiers for each class, which is to choose a, and the scalar constants associated with each classifier in h, to minimize the overall classification errors for a class:

$$(\alpha, h)^* = \arg\min\left\{\frac{1}{T}\sum_{t=1}^{t}\frac{1}{m}\sum_{i=1}^{m}\delta(h_t(x_i^t) \neq y_i^t)\right\} \quad (2)$$

where $$X_t = \{(x_i^t, y_i^t), i = 1, \ldots, m\},$$

here T is the number of classifiers assembled at time t; $x_i^t$ and $y_i^t$ are the feature and label of data $X_t$, respectively. α weighs how much trust can be place in the classifier $h_t$.

A difference between the method and system as disclosed herein and general ensemble methods (for example, AdaBoost or "Adaptive Boosting") are in drawing samples for training classifiers each time new data (cell images) arrives. When learning data at t+1, the knowledge learned from data at t can be transferred to the learning process at t+1. For example, assume two data sets, $X_t = \{x_j | j=1, \ldots, m\}$ and $X_{t+1} = \{x_i | i=1, \ldots, n\}$, the divergence between two data sets can be measured by using a distance metric, for example, Euclidean distance as follows, $$d_{ij} = \sqrt{\sum_{k=1}^{K}(x_{ik} - x_{jk})^2}, \quad (3)$$

where K is the number of features and assume the length of feature vector are the same between two data sets. A data set with a large divergence with respect to a reference data set likely exist unseen samples from the reference data set. Thus, the divergence of data set with size m with respect to a reference data set with size n can be defined as $$\left\{d_{ij} = \max_{j=1,\ldots,n} d_{i,j}, o_i = \arg\max_{j=1,\ldots,n} d_{i,j} \mid i = 1, \ldots, m\right\}, \quad (4)$$

where $o_i$ is the index of di in the reference data set. The distribution of divergence for the training data at time t+1 with respect to the training data at time t can be estimated recursively as $$P_{t+1}^i = \frac{(P_t(o_i) \cdot d_i)}{\sum_{i=1}^{m}\{P_t(o_i) * d_i\}}, i = 1, \ldots, m \quad (5)$$

In accordance with an exemplary embodiment, the divergence distribution in Equation (5) is modified iteratively each time a new data arrives. The larger the divergence, the higher the distribution. A data sample with a large divergence distribution value is likely an unseen sample (or new image). Because the unseen sample has a higher divergence with respect to the samples at t−1, the unseen sample will receive more chances to be explored at t.

In accordance with an exemplary embodiment, incremental learning consists of training classifiers and model update. The training classifier is a learned classifier based on the theory described above. For example, if number of classifiers for a particular class is over a predefined threshold, a weaker classifier can be pruned (or deleted). This can be accomplished, for example, in the model update step (step 18). In accordance with an exemplary embodiment, the learning algorithm can be described as follows:

1. Obtain a cell image $I_t$ at current time t
2. Identify a class that $I_t$ belongs to by using Equation (1); If $I_t$ belongs to an unknown class, a new class with class index c is created.
3. Extract feature set from $I_t$, with n instances: $X_t=(x_j, y_j)$, j=1 . . . n
4. Obtain $P_t$ by using $X_{t-1}$, $X_t$ and $P_{t-1}$, through Equation (5).
5. Train a classifier $h_t$ using $X_t$, and obtain the classification error rate $$\epsilon_t = \frac{1}{2} \sum_{j=1,\ldots,n} P_t(j) \cdot |h_t(x_j) - y_j| \quad (6)$$

6. Calculate the trust factor $\alpha_t$ by using Equation (2)
7. Form a classifier for the class c at time t by linear combination $$F_t^c(X_1,\ldots,_t) = F_{t-1}^c(X_1,\ldots,_{t-1}) \oplus \alpha_t h_t \quad (7)$$

8. Adjust the data divergence distribution by integrating classification error $$P_t(j) = P_t(j) \times \begin{cases} e^{-\alpha_t}, & \text{if } h_t(x_j) = y_j \\ 1, & \text{otherwise} \end{cases}, j=1,\ldots,n \quad (8)$$

9. Prune classifier by removing $h_i$ from $F_t^c(X_1,\ldots,_t)$ with the smallest $\alpha_i$ if the size of $F_t^c(X_1,\ldots,_t)$ reaches a predefined threshold
10. Increment t→t+1
11. Go to step 1 if a new image $I_{t+1}$ is obtained Prediction In accordance with an exemplary embodiment, prediction is to obtain machine detection result by using the learned model. Once obtain a input image $I_t$, and then extract features from $I_t$ with feature set $X_t$, find a closet class that $I_t$ belongs to, say class c, find a set of weak classifiers associated with class c, say $\{\alpha_t h_t > 0, t=1, \ldots, T\}$, and then the prediction response can be obtained through majority voting scheme as follows $$Pr(X) = \frac{N(\alpha_t h_t > 0, t=1,\ldots,T)}{N(\alpha_t h_t > 0, t=1,\ldots,T) + N(\alpha_t h_t < 0, t=1,\ldots,T)} \quad (9)$$

where N is the operator of counting. The classifiers $\{\alpha_t h_t, t=1,\ldots,T\}$ can be learned through the incremental learning approach as described above.

Figure 4B:
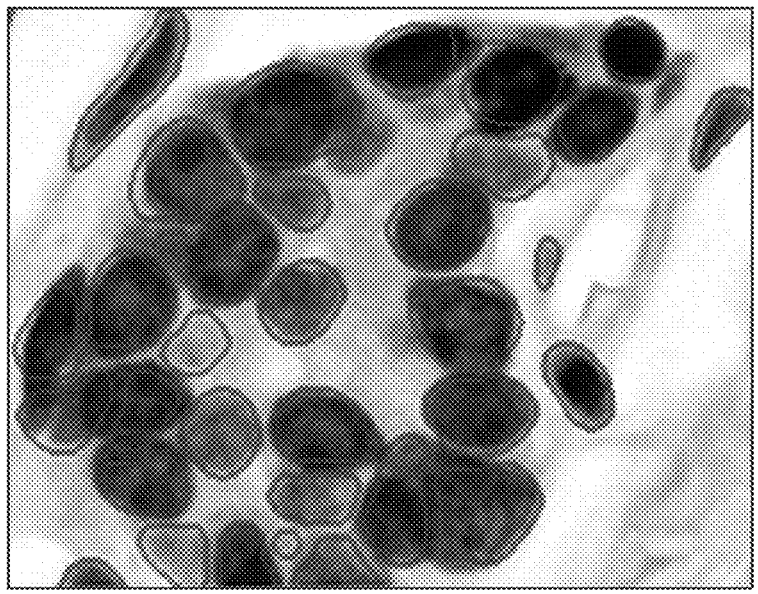
FIG. 4B is an illustration of cells which have been labeled after post processing in accordance with an exemplary embodiment.
Figure 4A:
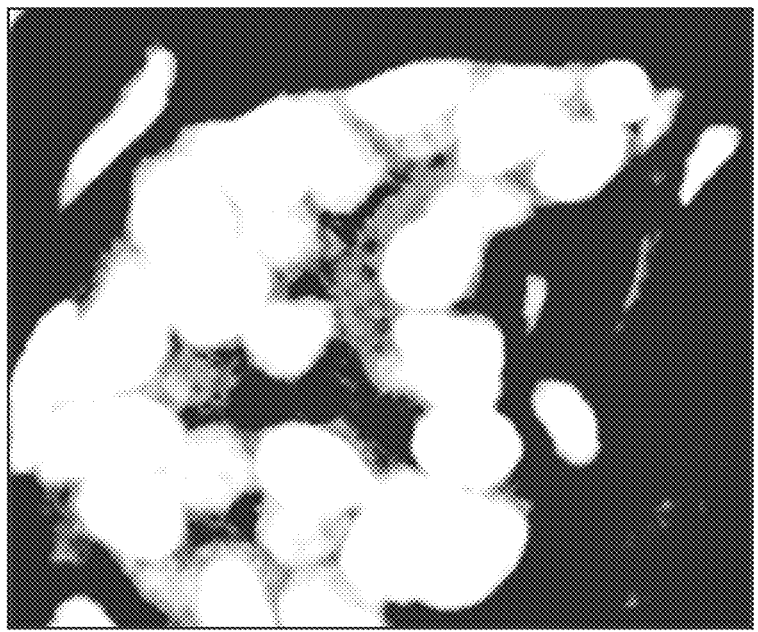
FIG. 4A is an illustration of a likelihood map of a cell image obtained in accordance with an exemplary embodiment.

In accordance with an exemplary embodiment, when evaluating a new arrival data, in step 9, the class model selection finds an existing class best fit for the arrival data. The prediction module 130 outputs the likelihood map 400 as shown in FIG. 4A by using Equation (9) and an indication whether the arrival data belongs to a new class or an existing class. The post process module (step 11) generates the machine labeled result 410 as shown in FIG. 4B.

Interactive Labeling

As described in the previous section, whenever a cell image streams in for prediction as described above, the system 100 will find a best class of classifier applied on it, which generates a cell detection result (step 12 in FIG. 1) with a confidence score S calculated by follows:

$$S = C \times \frac{\sum_{i=1}^{M} |P_i(f|x_i) - P_i(b|x_i)|}{M} \quad (10)$$

where M is the total number of pixels, $P_i(f|x_i)$ is the probability of a pixel $x_i$ being classified to a cell pixel while $P_i(b|x_i)$ is the probability of a pixel $x_i$ being classified to a background pixel (not a cell pixel); C is a coefficient and its value is determined by an indication whether the input image belongs to a new class or an existing class. The indication is one of the outputs from step 10 in FIG. 1. If S is greater than a predefined threshold, the machine label is confident using the current learned model. Otherwise, the current learned model is not confident enough to decide some cell labels. In this case, human and/or manual intervention can be used to interactively correct machine labeled results through a software user interface, as indicated by step 14 in FIG. 1. The final labeled result can be used for further pathologic analysis. Simultaneously, the cell image extracted in step 6 and the result obtained in step 15 can be feedback for the incremental learning (step 17) for building and updating the classifiers for the class that the cell image belongs to (identified or generated by steps 5, 8).

In accordance with an exemplary embodiment, as more cell images are involved in learning for a particular class of cell, the system gradually adapts intra-class image variation during the long term learning. As a result, the performance of detection accuracy improves gradually. The update class pivot feature is indicated by step 16 in FIG. 1 can be updated by a running average as follows $$f_{t+1}^c = \frac{(f_t^c + f_{t+1}^c)}{2} \quad (11)$$

where $f_t^c$ and $f_{t+1}^c$ are the feature vectors of class c at time t and t+1, respectively.

Figure 5:
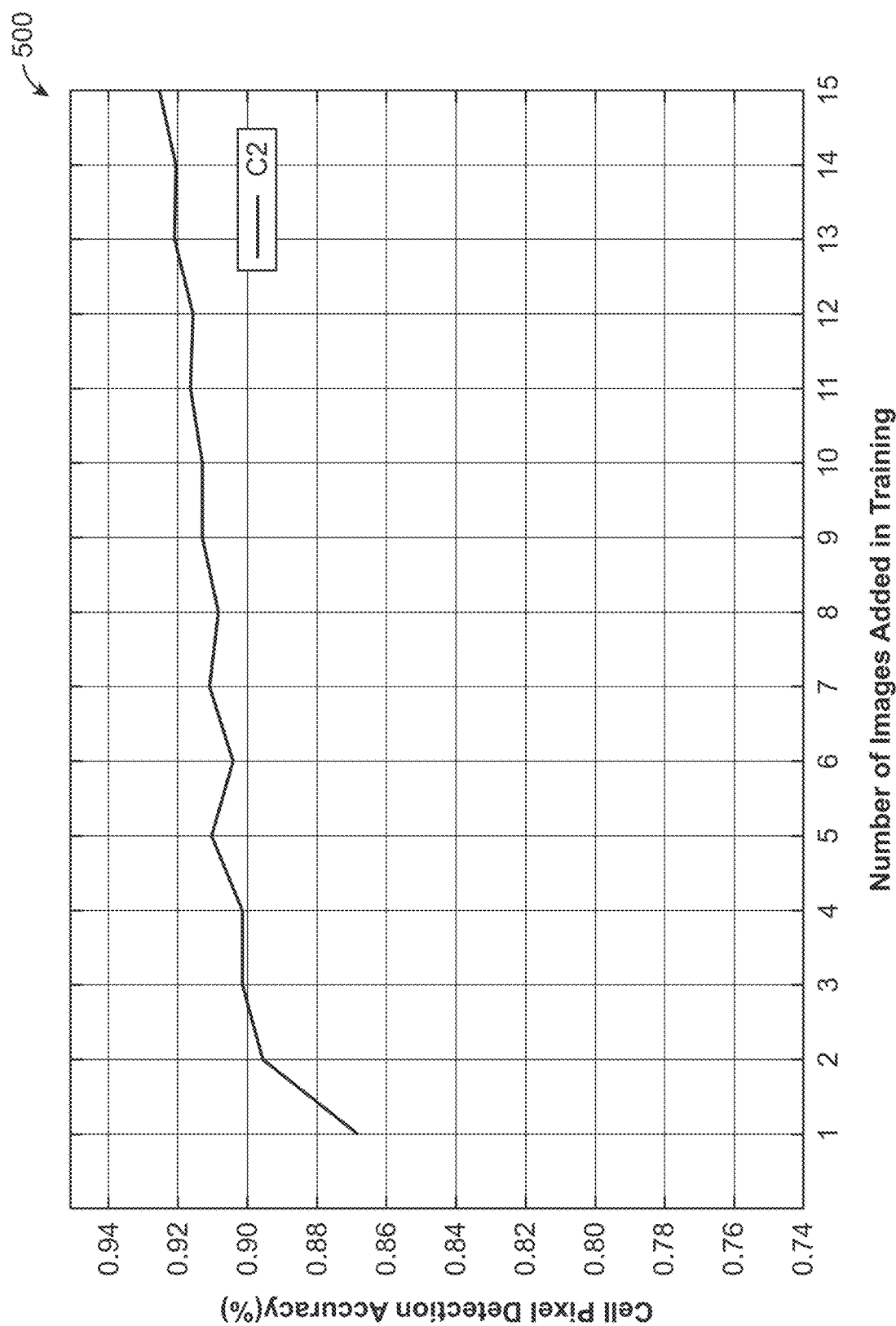
FIG. 5 is an experimental result illustrating the performance of incremental learning applied in cell detection for a class of cell images, where the image shows that the accuracy of detection improves gradually as training images are incrementally added in accordance with an exemplary embodiment.

FIG. 5 is an experimental result 500 illustrating the performance of incremental learning applied in cell detection for a class of cell images, where the image shows that the accuracy of detection improves gradually as training images are incrementally added in accordance with an exemplary embodiment.

Figure 6:
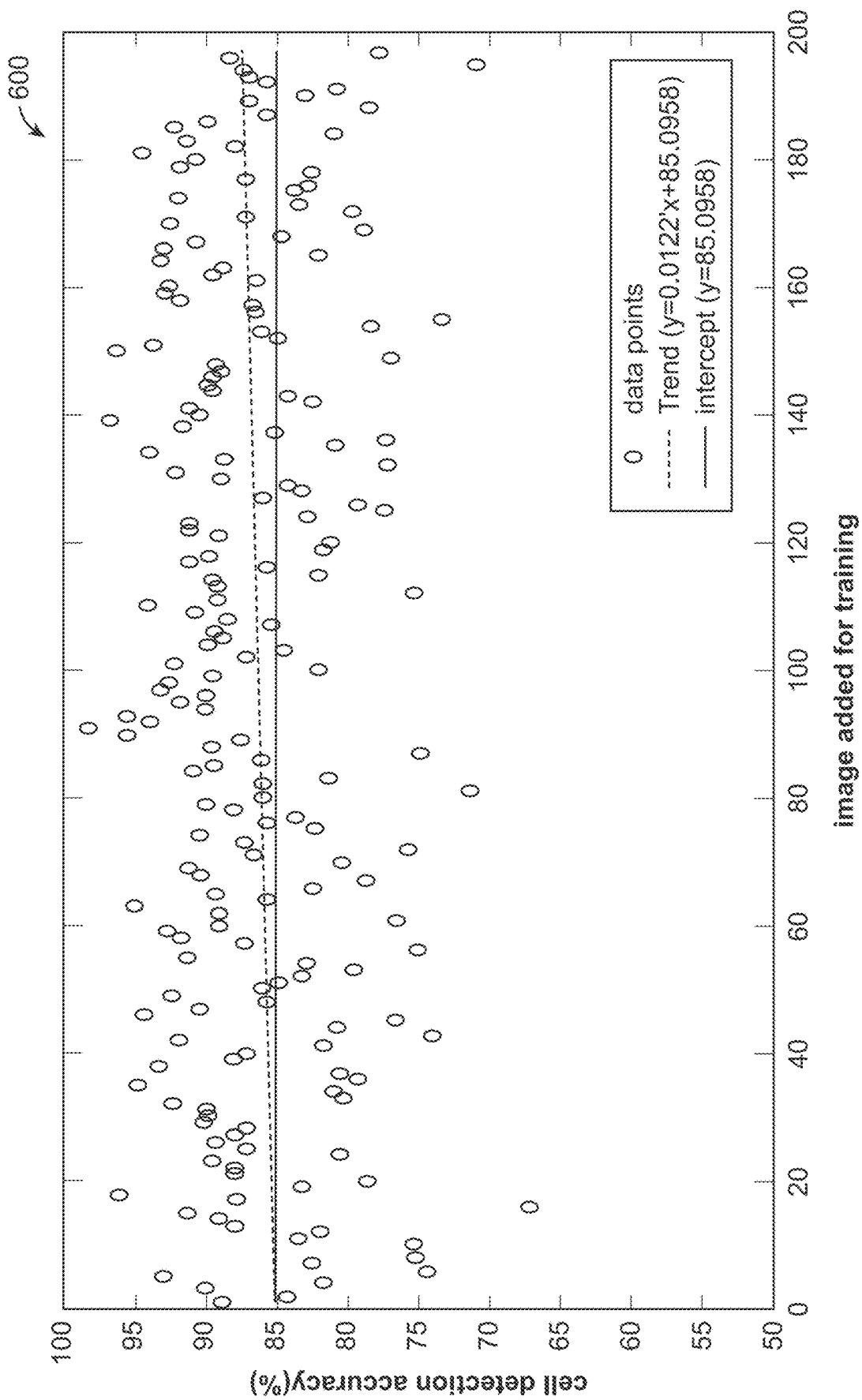
FIG. 6 is an experimental result showing that overall system performance gradually improves as the system incrementally learns by the arrival or receipt of cell images, and wherein at the beginning, only one image for initial training was given, and afterwards, the system was able to achieve an average of 85% accuracy, and wherein the performance gradually improves during the continuous learning process, and wherein the dashed line is a statistic trend of accuracy improvement, and the solid line is the average of the accuracy that the system achieved.

FIG. 6 is an experimental result 600 showing that overall system performance gradually improves as the system incrementally learns by the arrival or receipt of cell images, and wherein at the beginning, only one image for initial training was given, and afterwards, the system was able to achieve an average of 85% accuracy, and wherein the performance gradually improves during the continuous learning process, and wherein the dashed line is a statistic trend of accuracy improvement, and the solid line is the average of the accuracy that the system achieved.

Figure 7:
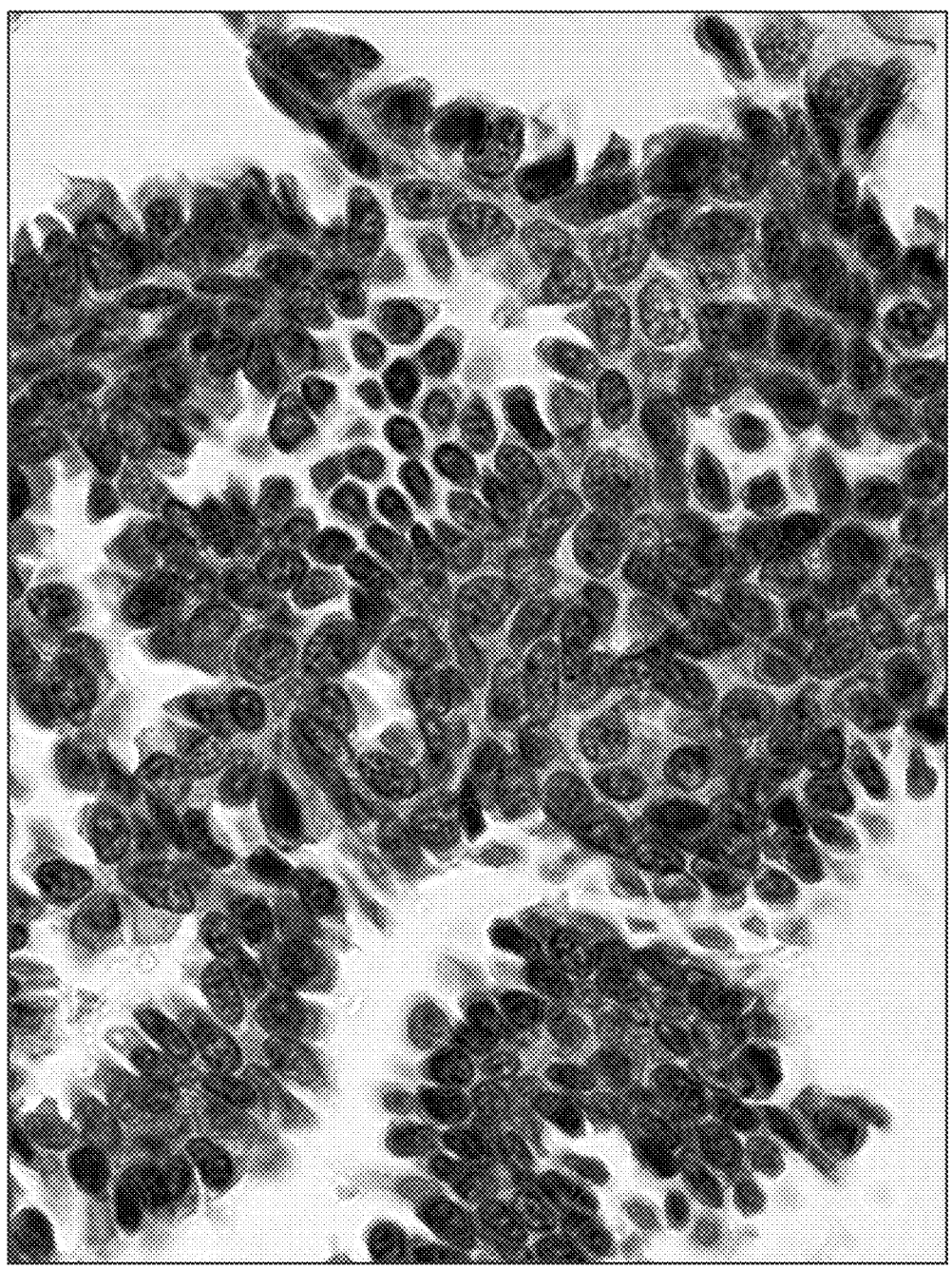
FIG. 7 is an example of machine annotation results from a cell image in accordance with an exemplary embodiment, and wherein the contours are cell boundaries automatically annotated by machine.

FIG. 7 is an example of machine annotation results 700 from a cell image in accordance with an exemplary embodiment, and wherein the contours are cell boundaries automatically annotated by machine.

In accordance with an exemplary embodiment, a non-transitory computer readable medium containing a computer program storing computer readable code for cell annotation is disclosed, the program being executable by a computer to cause the computer to perform a process comprising: receiving at least one new cell image for cell detection; extracting cell features from the at least one new cell image; comparing the extracted cell features to a matrix of cell features of each class to predict a closest class, wherein the matrix of cell features has been generated from at least initial training data comprising at least one cell image; detecting cell pixels from the extracted cell features of the at least one new cell image using the predicted closest class to generate a likelihood map; extracting individual cells from the at least one cell image by segmenting the individual cells from the likelihood map; performing a machine annotation on the extracted individual cells from the at least one new cell image to identify cells, non-cell pixels, and/or cell boundaries; calculating a confidence level for the machine annotation on the extracted individual cells from the at least one new cell image; and modifying the machine annotation if the confidence level is below a predetermined threshold.

In accordance with an exemplary embodiment, a non-transitory computer readable medium containing a computer program storing computer readable code for adaptive incremental learning for cell annotation is disclosed, the program being executable by a computer to cause the computer to perform a process comprising: generating a matrix of cell features for each of a plurality of classes of cell images; identifying one or more cell features of each of the plurality of classes of cell images; updating the one or more cell features for each of the plurality of classes of cell images upon receipt of additional cell images; constructing a plurality of classifiers for each of the plurality of classes of cell images, each of the plurality of classifiers corresponding to one or more cell features; weighting each of the plurality of classifiers for each of the plurality of classes of cell images; obtaining a new cell image; identifying a class from the plurality of classes in which the cell image belongs, and if no class is identified, creating a new class; if the cell image belongs to the class from the plurality of classes, extracting features from cell image and using the extracted features to generate a new classifier for the class from the plurality of classes if a classification error rate is less than a predetermined threshold, and if the classification error rate is greater than the threshold, classifying the extracted features as the new class; and if the new classifier is generated, appending the new classifier to the plurality of classifiers for the class from the plurality of classes.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A method for cell annotation, the method comprising:
receiving at least one new cell image for cell detection;
extracting cell features from the at least one new cell image;
comparing the extracted cell features to a matrix of cell features of each class to predict a closest class, wherein the matrix of cell features has been generated from at least initial training data comprising at least one cell image, wherein the comparing the extracted cell features from the at least one new cell image to the matrix of cell features is performed by a similarity matching, the similarity matching comprising:
performing a suitable distance measurement between histograms using:

$$D(H(a), H(b)) = \sum_{1}^{k} \left(1 - \frac{1 + |\min(h_i(a), h_i(b))|}{1 + |\max(h_i(a), h_i(b))| + |\min(h_i(a), h_i(b))|}\right)$$

where H(a) is a histogram for image a and H(b) is a histogram for image b with k histogram bins;
mapping colors in the image into a discrete color space containing k colors, then the color histogram H(a) is a vector $[h_1(a), \ldots, h_k(a)]$, and H(b) is a vector $[h_1(b), \ldots, h_k(b)]$; and
wherein if D(H(a), H(b)) is greater than a predefined threshold, the image belongs to an unknown class, and if the less than the predefined threshold, then the image belongs to a known class;
detecting cell pixels from the extracted cell features of the at least one new cell image using the predicted closest class to generate a likelihood map;
extracting individual cells from the at least one cell image by segmenting the individual cells from the likelihood map;
performing a machine annotation on the extracted individual cells from the at least one new cell image to identify cells, non-cell pixels, and/or cell boundaries;
calculating a confidence level for the machine annotation on the extracted individual cells from the at least one new cell image; and
modifying the machine annotation if the confidence level is below a predetermined threshold.
2. The method according to claim 1, comprising:
generating a final annotation for pathology analysis or feedback for further learning based on the confidence level and if the confidence level fell below the predetermined threshold, manually modifying the machine annotation.
3. The method according to claim 2, comprising:
updating the matrix of cell features for each class of cell images based on the final annotation.
4. A method for cell annotation, the method comprising:
receiving at least one new cell image for cell detection;
extracting cell features from the at least one new cell image;
comparing the extracted cell features to a matrix of cell features of each class to predict a closest class, wherein the matrix of cell features has been generated from at least initial training data comprising at least one cell image;
detecting cell pixels from the extracted cell features of the at least one new cell image using the predicted closest class to generate a likelihood map;
extracting individual cells from the at least one cell image by segmenting the individual cells from the likelihood map;

performing a machine annotation on the extracted individual cells from the at least one new cell image to identify cells, non-cell pixels, and/or cell boundaries;
calculating a confidence level for the machine annotation on the extracted individual cells from the at least one new cell image, wherein the calculation of the confidence level comprises:
calculating a confidence score S:

$$S = C \times \frac{\sum_{i=1}^{M} |P_i(f \mid x_i) - P_i(b \mid x_i)|}{M}$$

wherein M is a total number of pixels, $P_i(f|x_i)$ is a probability of a pixel $x_i$ being classified to a cell pixel while $P_1(b|x_1)$ is a probability of a pixel $x_i$ being classified to a background pixel (not a cell pixel); and
wherein C is a coefficient and its value is determined by an indication whether the at least one cell image belongs to a new class or an existing class; and
modifying the machine annotation if the confidence level is below a predetermined threshold.

5. The method according to claim 4, wherein if S is greater than a predefined threshold, the machine annotation is confident using a current learned model, and if S is less than the predefined threshold, the current learned model is not confident enough to decide cell labels from the at least one new cell image.

6. The method according to claim 4, comprising:
generating a final annotation for pathology analysis or feedback for further learning based on the confidence level and if the confidence level fell below the predetermined threshold, manually modifying the machine annotation.

7. The method according to claim 6, comprising:
updating the matrix of cell features for each class of cell images based on the final annotation.

8. The method according to claim 4, wherein the comparing the extracted cell features from the at least one new cell image to the matrix of cell features is performed by a similarity matching, the similarity matching comprising:
performing a suitable distance measurement between histograms using:

$$D(H(a), H(b)) = \sum_{1}^{k} \left(1 - \frac{1 + |\min(h_i(a), h_i(b))|}{1 + |\max(h_i(a), h_i(b))| + |\min(h_i(a), h_i(b))|}\right)$$

where H(a) is a histogram for image a and H(b) is a histogram for image b with k histogram bins;
mapping colors in the image into a discrete color space containing k colors, then the color histogram H(a) is a vector $[h_1(a), \ldots, h_k(a)]$, and H(b) is a vector $[h_1(b), \ldots, h_k(b)]$; and
wherein if D(H(a), H(b)) is greater than a predefined threshold, the image belongs to an unknown class, and if the less than the predefined threshold, then the image belongs to a known class.

9. A non-transitory computer readable medium containing a computer program storing computer readable code for cell annotation, the program being executable by a computer to cause the computer to perform a process comprising:
receiving at least one new cell image for cell detection;
extracting cell features from the at least one new cell image;
comparing the extracted cell features to a matrix of cell features of each class to predict a closest class, wherein the matrix of cell features has been generated from at least initial training data comprising at least one cell image;
detecting cell pixels from the extracted cell features of the at least one new cell image using the predicted closest class to generate a likelihood map;
extracting individual cells from the at least one cell image by segmenting the individual cells from the likelihood map;
performing a machine annotation on the extracted individual cells from the at least one new cell image to identify cells, non-cell pixels, and/or cell boundaries;
calculating a confidence level for the machine annotation on the extracted individual cells from the at least one new cell image, wherein the calculation of the confidence level comprises:
calculating a confidence score S:

$$S = C \times \frac{\sum_{i=1}^{M} |P_i(f \mid x_i) - P_i(b \mid x_i)|}{M}$$

wherein M is a total number of pixels, $P_i(f|x_i)$ is a probability of a pixel $x_i$ being classified to a cell pixel while $P_i(b|x_i)$ is a probability of a pixel $x_i$ being classified to a background pixel (not a cell pixel); and
wherein C is a coefficient and its value is determined by an indication whether the at least one cell image belongs to a new class or an existing class; and
modifying the machine annotation if the confidence level is below a predetermined threshold.

10. The computer readable medium according to claim 9, comprising:
generating a final annotation for pathology analysis or feedback for further learning based on the confidence level and if the confidence level fell below the predetermined threshold, manually modifying the machine annotation.

11. The computer readable medium according to claim 10, comprising:
updating the matrix of cell features for each class of cell images based on the final annotation.

12. The computer readable medium according to claim 9, wherein the comparing the extracted cell features from the at least one new cell image to the matrix of cell features is performed by a similarity matching, the similarity matching comprising:
performing a suitable distance measurement between histograms using:

$$D(H(a), H(b)) = \sum_{1}^{k} \left(1 - \frac{1 + |\min(h_i(a), h_i(b))|}{1 + |\max(h_i(a), h_i(b))| + |\min(h_i(a), h_i(b))|}\right)$$

where H(a) is a histogram for image a and H(b) is a histogram for image b with k histogram bins;
mapping colors in the image into a discrete color space containing k colors, then the color histogram H(a) is a vector $[h_1(a), \ldots, h_k(a)]$, and H(b) is a vector $[h_i(b), \ldots, h_k(b)]$; and wherein if D(H(a), H(b)) is greater than a predefined threshold, the image belongs to an unknown class, and if the less than the predefined threshold, then the image belongs to a known class.

13. The computer readable medium according to claim 9, wherein if S is greater than a predefined threshold, the machine annotation is confident using a current learned model, and if S is less than the predefined threshold, the current learned model is not confident enough to decide cell labels from the at least one new cell image.

14. A system for cell annotation, the system comprising:
at least one processor configured to:
receive at least one new cell image for cell detection;
extract cell features from the at least one new cell image;
compare the extracted cell features to a matrix of cell features of each class to predict a closest class, wherein the matrix of cell features has been generated from at least initial training data comprising at least one cell image;
detect cell pixels from the extracted cell features of the at least one new cell image using the predicted closest class to generate a likelihood map;
extract individual cells from the at least one cell image by segmenting the individual cells from the likelihood map;
perform a machine annotation on the extracted individual cells from the at least one new cell image to identify cells, non-cell pixels, and/or cell boundaries;
calculate a confidence level for the machine annotation on the extracted individual cells from the at least one new cell image, wherein the calculation of the confidence level comprises:
calculating a confidence score S:

$$S = C \times \frac{\sum_{i=1}^{M} |P_i(f \mid x_i) - P_i(b \mid x_i)|}{M}$$

wherein M is a total number of pixels, $P_i(f|x_i)$ is a probability of a pixel $x_i$ being classified to a cell pixel while $P_i(b|x_i)$ is a probability of a pixel $x_i$ being classified to a background pixel (not a cell pixel); and wherein C is a coefficient and its value is determined by an indication whether the at least one cell image belongs to a new class or an existing class; and
modify the machine annotation if the confidence level is below a predetermined threshold.

15. The system according to claim 14, wherein the at least one processor is configured to:
generate a final annotation for pathology analysis or feedback for further learning based on the confidence level and if the confidence level fell below the predetermined threshold, manually modifying the machine annotation; and
update the matrix of cell features for each class of cell images based on the final annotation.

16. The system according to claim 14, wherein the comparing the extracted cell features from the at least one new cell image to the matrix of cell features is performed by a similarity matching, the similarity matching comprising:
performing a suitable distance measurement between histograms using:

$$D(H(a), H(b)) = \sum_{1}^{k} \left(1 - \frac{1 + |\min(h_i(a), h_i(b))|}{1 + |\max(h_i(a), h_i(b))| + |\min(h_i(a), h_i(b))|}\right)$$

where H(a) is a histogram for image a and H(b) is a histogram for image b with k histogram bins;
mapping colors in the image into a discrete color space containing k colors, then the color histogram H(a) is a vector $[h_1(a), \ldots, h_k(a)]$, and H(b) is a vector $[h_1(b), \ldots, h_k(b)]$; and
wherein if D(H(a), H(b)) is greater than a predefined threshold, the image belongs to an unknown class, and if the less than the predefined threshold, then the image belongs to a known class.

17. The system according to claim 14, wherein if S is greater than a predefined threshold, the machine annotation is confident using a current learned model, and if S is less than the predefined threshold, the current learned model is not confident enough to decide cell labels from the at least one new cell image.

* * * * *